United States Patent

Henry et al.

[11] Patent Number: 6,069,203
[45] Date of Patent: May 30, 2000

[54] HIGH SOLIDS COATING COMPOSITIONS

[75] Inventors: Nathalie Henry; Achim Krebs; Marc Carlo Moerman; Griet Uyterrhoeven, all of Ottignies, Belgium

[73] Assignee: Shell Oil Company, Houston, Tex.

[21] Appl. No.: 09/159,810

[22] Filed: Sep. 23, 1998

[30] Foreign Application Priority Data

Sep. 29, 1997 [EP] European Pat. Off. ............... 97204126
Oct. 29, 1997 [EP] European Pat. Off. ............... 97203351

[51] Int. Cl.⁷ .................................................. C08G 18/63
[52] U.S. Cl. .............................. 525/131; 528/73; 528/75; 428/423.1
[58] Field of Search ............................... 525/131; 528/73, 528/75; 428/423.1

[56] References Cited

U.S. PATENT DOCUMENTS

| | | |
|---|---|---|
| 4,262,099 | 4/1981 | Heaps et al. . |
| 4,314,918 | 2/1982 | Birkmeyer ............................. 525/143 |
| 5,354,797 | 10/1994 | Anderson et al. . |
| 5,852,120 | 11/1998 | Bederke et al. . |

FOREIGN PATENT DOCUMENTS

| | | |
|---|---|---|
| 375078 | 6/1990 | European Pat. Off. . |
| 96/20968 | 7/1996 | WIPO . |

OTHER PUBLICATIONS

International Search Report dated Mar. 2, 1999.

*Primary Examiner*—Rachel Gorr
*Attorney, Agent, or Firm*—Y. Grace Tsang

[57] ABSTRACT

Coating compositions comprising a binder (60–90 wt. %) and an organic carrier liquid (10–40 wt. %). The binder comprises (wt. % of binder):

(a) hydroxy functional oligoether (5–50);

(b) hydroxy functional (meth)acrylic copolymer (40–60), including cycloaliphatic (meth)acrylate comonomer and/or an alkyl substituted aromatic vinyl comonomer (at most 10)

(c) polyisocyanate crosslinkers (5–40); and (d) a curing catalyst.

9 Claims, No Drawings

HIGH SOLIDS COATING COMPOSITIONS

FIELD OF THE INVENTION

The invention relates to two component high solids coating compositions, useful for a clear coat or a coloured top coat for automobiles and trucks and in general in metal coatings, such as maintenance coatings, general metal coatings or industrial coatings. More in particular the invention relates to two component high solids coating compositions, comprising at least a hydroxy-functional (meth)acrylate copolymer derived from comonomers comprising an alkyl-substituted cycloaliphatic (meth)acrylic comonomer and/or alkyl-substituted aromatic vinyl comonomer.

BACKGROUND OF THE INVENTION

Said compositions were known from e.g. U.S. Pat. No. 4,314,918, WO 96/20968, WO 96/23034.

From U.S. Pat. No. 4,314,918, coating compositions were known, the vehicle portion of which essentially consisted on a weight solids basis, of:

(a) from 35 to 55 wt % of a cross-linking agent, selected from a vast variety of all possible cross-linking agents;
(b) from 15% to 50% of a curable polyol resin; and
(c) from 15% to 50% of a reactive diluent derived from the reaction of (i) from 0.25 to 4 moles of a glycidyl ester with (ii) each mole of a functional material having a molecular weight of less than 1000, a hydroxy equivalent weight of from 30 to 1000 and a carboxy equivalent weight of from 50 to 1000, provided the total hydroxyl and carboxyl functionality of the functional material is at least 2.0.

The reactive diluent was characterized by an acid number of less than 50, a non-volatile content of greater than 85% and a Gardner-Holdt viscosity of less than Z-10.

However, by application of the disclosed preparation processes, high solid content reactive diluents of 95% or more, as presently required by modern paint industry economics and by environmental and health authorities, could not be obtained, and the coating compositions obtained according to the examples VII and VIII actually showed relatively low solids contents and the drying/curing of these coatings could not be attained at ambient temperatures, so that a baking step after application was necessary.

Moreover, it will be appreciated that the coating composition according to example VIII comprised a binder without acrylate copolymers. Such binder forms very dense cross-linked cured coating films, which showed totally unattractive film properties, i.e. too hard and too glassy films. The coating obtained with the product obtained according to example I, and the usable polyisocyanates appeared to form an inferior coating film only and showed moreover an unacceptable drying/curing.

WO 96/20968 disclosed coating compositions, comprising as separate binder components (a) 5 to 50 percent, by weight of total binder, of one or more hydroxy-functional oligoesters, having at least one hydroxyl group on each of at least three separate branches of the oligoester, a polydispersity of less than 2.5, a hydroxyl value of between 80 and 280, and a number average molecular weight (Mn) between 150 and 3000, (b) 10 to 90 percent by weight of the total binder, of a hydroxy-functional acrylic or methacrylic copolymer with an Mn between 500 and 15000, having a hydroxy-functional comonomer content between 10 and 50 weight percent of the copolymer and at least 10 percent of comonomers selected from the group consisting of alkyl-substituted cycloaliphatic meth(acrylic) comonomer and/or alkyl-substituted aromatic vinyl comonomers and combinations thereof, wherein the alkyl-substituted cycloaliphatic group on said comonomers had at least nine carbon atoms and the alkyl-substituted aromatic group on said comonomers had at least ten carbon atoms.

As preferred hydroxy-functional oligomer were used oligoesters obtained by the reaction of a branched polycarboxylic acid and a monoepoxyester. Actually applied hydroxy-functional oligomers, providing acceptable final coating compositions, were the product of a ring opening polycondensation reaction in which a multifunctional polyol is reacted with an acid anhydride and subsequently with an epoxide.

On the other hand polymeric vehicles for high solids coatings were known from WO 96/23034, which comprised a blend of at least one non-mesogenic substantially linear oligoester diol and at least one hardener which was a mesogenic polyol, phenolic ester alcohol or crystalline polyol, which blend is effective for reaction with a cross-linker, which is reactive with the non-mesogenic oligoester and hardener.

The mesogenic polyol had a number average molecular weight in the range of from 186 to 4000, a polydispersity index of not more than 2.6 and comprising from 5 to 50 weight percent mesogens, the crystalline polyol was oligomeric or non-oligomeric and had from 5 to 200 carbon atoms, the oligomeric crystalline polyol had a number average molecular weight in the range of from 400 to 4000, the non-oligomeric polyol had a molecular weight in the range of from 120 to 500, and a solubility in the formulated coating composition of not more than 10 g/l at a temperature of from 0° C. to 40° C.

The phenolic ester alcohol having at least two ester groups; at least one aliphatic hydroxy group and at least one phenolic hydroxy group.

Preferably the mesogenic polyol had the general formula

R-T-E-F-R, wherein R is the adduct of a mono-oxirane, which contained not more than 25 carbon atoms.

From WO 97/13741 low viscosity, high solids polyesterdiols and coating compositions containing them, were known.

Said polyesterdiols had low viscosities of less than 3500 cps, high content of non-volatile matter in excess of 96 wt %, and narrow molecular weight distribution of less than about 1.4. They were prepared by esterification of one or more aliphatic dicarboxylic acids or ester derivatives thereof, using at least a 1.5 molar excess of one or more aliphatic diols until an acid number of less than 20 is achieved, and stripping excess diol from the polyesterdiol reaction product. Where esterification catalyst was used, the catalyst is substantially removed prior to stripping excess unreacted diol from polyesterdiol reaction product.

The polyesterdiols so produced had been found to be useful in particular as coatings, paints and adhesives, providing coatings with reduced content of volatile organic compounds but combined with an unpracticable viscosity under normal operation conditions.

Because of an increasing pressure from health authorities and/or environmental authorities, the emissions of volatile organic compounds (VOC) and mainly of organic solvents during baking of the original resin composition, must be reduced by paint and coating industry and further extensive research efforts have been directed on the aim to provide low VOC coating compositions, which moreover, show a sufficiently low viscosity in order to meet modern coating application requirements, and acceptable final properties of the coating composition after baking.

Due to economic pressure from paint manufacturers and their customers, there is a strong need for lower drying temperatures and shorter application times in combination with an improved pot life.

It will be appreciated that as predominant trend has been derived by persons skilled in the art from the hereinbefore discussed prior art the use of least of low molecular weight oligoesters as binder component.

However, increasing the solids content of paints by adding reactive diluents can deteriorate either pot life, or drying and curing behaviour of the applied paint.

Therefore an object of the present invention is to provide improved coating compositions, showing an attractive combination of viscosity, VOC and final physical properties, such as hardness, flexibility, and pot life and drying behaviour.

Another object of the present invention is to provide new binder components to enable the hereinbefore specified coating compositions.

As a result of extensive research and experimentation such as coating compositions aimed at and binder components to be used therein have surprisingly been found now.

DETAILED DESCRIPTION OF THE INVENTION

Accordingly the present invention relates to a coating composition comprising 60 to 90 percent by weight of binder components and from 40 to 10 percent by weight of an organic liquid carrier, wherein the binder comprises the following separate components:

(a) 5 to 50 percent by weight, relative to the weight of the binders, of one or more hydroxy-functional oligoethers derived from at least one polyol, free of carboxyl groups and having three or four hydroxyl groups, and a mono-glycidyl ester of a branched carboxylic acid, containing from 5 to 13 carbon atoms, the oligoether having a number average molecular weight (Mn) of from 150 to 1000 g/mol, a molecular weight distribution (MWD) <1.10 and a hydroxy value of between 180 and 700, (b) 40 to 60 percent by weight, relative to the weight of the binder, of one or more hydroxy-functional acrylic or methacrylic copolymer with a Mn between 500 and 2500, having a hydroxy-functional comonomer content between 10 and 50 weight percent of the copolymer derived from the reaction products of mono-glycidyl esters of a branched carboxylic acid containing from 5 to 13 carbon atoms and acrylic acid or methacrylic acid, and combinations thereof, and optionally mixed with an amount of at most 10% by weight relative to the total weight of comonomers, selected from the group consisting of cycloaliphatic (meth)acrylic comonomers and/or alkyl substituted aromatic vinyl monomers, wherein the alkyl-substituted cycloaliphatic group on said comonomers has at least nine carbon atoms and the alkyl-substituted aromatic group on said comonomers has at least ten carbon atoms, (c) 5 to 40 percent, relative to the weight of the binder, of polyisocyanate cross-linkers, (d) an effective amount of curing catalyst.

With the term "oligoether" as used throughout the specification are meant molecules constituted by from 1 to 10 moles monoglycidylester of the branched carboxylic acid per mole multifunctional polyol.

The present compositions, depending on the presence of pigments, dyes and other usual components of coatings, can be used as primer, primer surfacer, coloured basecoat and/or clearcoat.

The present compositions have been surprisingly found to enable application by a spray gun at high initial viscosity.

It will be appreciated that this will result in shorter application times, and as a consequence in cost decrease.

The present compositions preferably comprise from 10 to 40 percent by weight of a hydroxy-functional oligoether, relative to the weight of the complete binder.

This hydroxy-functional, optionally branched oligoether, has at least one hydroxy group on each of the ends of the molecule and preferably on each of the possible separate branches of the oligoether, has a hydroxy value of between 180 and 700, and preferably from 180 to a 600, a number average molecular weight of from 150 to 1000 g/mol and preferably from 250 to 500 g/mol, and a molecular weight distribution MWD <1.10.

Said oligoether may preferably be prepared by using a monoglycidylester of a branched carboxylic acid, such as CARDURA E10 (CARDURA is a trademark), or CARDURA E5, which are glycidyl esters of VERSATIC acid $C_{10}$ (VERSATIC is a trademark) and pivalic acid $C_5$ respectively.

The hydroxy-functional oligoethers may be prepared by employing a ring opening polycondensation reaction in which r moles of an s-functional polyol, wherein s is 3 or 4, or a blend of polyols, so that the average functionality is at least 3, are reacted with up to or less than r×s moles of monoglycidylester.

Preferably the hydroxy-functional oligoether is prepared by processes as disclosed in e.g. EP 0244897A, EP 0449358A and EP 375078B.

Suitable polyols for the above-mentioned synthesis are glycerine, trimethylol propane, pentaerythritol, and the like.

By way of illustration, one structural embodiment of the oligoether, which may be used in the present invention, can be drawn as follows, if the starting polyol is trimethylolpropane.

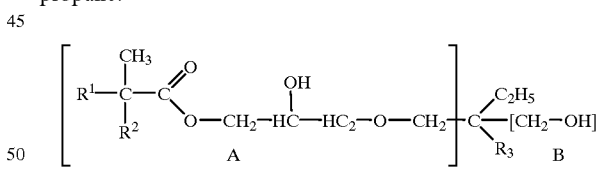

wherein, in this example, $R^1$ and $R^2$ present the aliphatic side branches derived from the glycidyl ester of a tertiary acid, and $R^3$ can be either of structure A or B. For compounds described as suitable in this invention, A can be present in range from 1 through 3, $R^3$ can be either of structure A or B. In the preferred three-functional embodiment, A will present one, and $R^3$ will have the structure of B.

The present composition preferably comprises from 45 to 55 percent, relative to the weight of the binder, of one or more (meth)acrylate copolymers. This copolymer comprises:

(a) 10–50 weight percent, preferably 20–50 percent, by weight of the copolymer, of a hydroxy-functional monomer; and (b) 0–10 weight percent, of comonomers selected from the group consisting of alkyl-substituted cycloaliphatic (meth)acrylic comonomers, alkyl-substituted aromatic vinyl comonomer and combinations thereof, wherein the alkyl-substituted cycloaliphatic group is at least $C_9$ (has at least nine carbon atoms, preferably 9 to 12) and the alkyl-substituted aromatic vinyl group is at least $C_{10}$ (has at least 10 carbon atoms, preferably 10 to 12);

(c) 0–80 weight percent, preferably 25 to 50 percent, of other copolymerizable comonomers.

Said hydroxy-functional monomers (a) partially or totally consist of a reaction product of a monoglycidyl ester of a branced $C_5$–$C_{13}$ carboxylic acid and acrylic or methacrylic acid and/or the copolymer can contain hydroxy alkyl esters of mono- or di-ethylenically unsaturated carboxylic acids.

Ethylenically unsaturated monomers containing hydroxy functionality that may be used in the copolymer include hydroxy alkyl acrylates and hydroxy alkyl methacrylates, wherein the alkyl has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Further examples are the reaction product of acrylic acid, methacrylic acid, itaconic acid, maleic acid, fumaric acid with monoepoxy compounds such as ethylene oxide, alkylepoxy ethers, alkylepoxyesters, and the like. A hydroxy-functionality may also be obtained from monomer precursors, for example, the epoxy group of a glycidyl methacrylate unit in a polymer. Such an epoxy group may converted, in a post polymerization reaction with water or a small amount of acid, to a hydroxy group.

Preferably as main source of hydroxy functional monomer(a) are used the reaction products of monoglycidyl esters of branched $C_5$–$C_{13}$ carboxylic acids and acrylic or methacrylic acid as obtained by a process such as described in e.g. U.S. Pat. No. 4,350,809.

The hereinbefore mentioned alkyl-substituted cycloaliphatic acrylate or methacrylate may include, among others, trimethylcyclohexyl methacrylate, t-butyl cyclohexyl methacrylate, isobornyl methacrylate, or combinations thereof. Preferred aromatic vinyl monomers are alkyl-substituted styrenes such as t-butyl styrene. The latter monomer is commercially available from Deltech, Interorgana, or Amoco in the U.S.A. Blends of the above-mentioned comonomers, for example, t-butylstyrene with such monomers as isobornyl-, t-butylcyclohexyl-, or trimethylcyclohexyl-acrylate or methacrylate are also suitable.

Preferably, the balance of the copolymer comprises other (meth)acrylate and/or vinyl monomers including styrene, methyl styrene, and/or vinyltoluene monomers. By the term "(meth)acrylate" in this application is meant methacrylate, acrylate or combinations thereof. Preferably, the majority of these monomers (greater than 50% by weight) in the balance of the copolymer should be methacrylate or acrylate monomers. For example, alkyl methacrylates having 1–12 carbons in the alkyl group can be used such as methyl methacrylate, ethyl methacrylate, propyl methacrylate, isopropyl methacrylate, iso-butyl or tertiary-butyl methacrylate, pentyl methacrylate, hexyl methacrylate, 2-ethyl-hexyl methacrylate, nonyl methacrylate, lauryl methacrylate and the like or combinations thereof. Aryl methacrylates such as benzyl methacrylate also can be used. Half- and diesters of maleic, itaconic, or fumaric acid and combinations thereof can also be used.

The composition of the hydroxy-functional copolymer is such that the hydroxyl value is preferably between 60 and 180, the number average $M_n$ below 4000, and the theoretical calcined $T_g$ above 30° C. (as calculated according to the FOX equation. The copolymer may be prepared using free radical initiated polymerization in solution, for example, as described in U.S. Pat. No. 4,322,508.

The weight ratio of oligoether to (meth)acrylate copolymer is suitably from 10/90 up to 95/10, preferably 50/50 to 10/90, most preferably between 40/60 and 20/80.

The (meth)acrylate copolymer should have an OH value of 60 to 180, preferably between 100 and 150, a calculated $T_g$ (according to the Fox equation) of at least 40° C., and a number average molecular weight $M_n$ of between 500 and 2500.

The coating composition contains one or more polyisocyanate cross-linkers.

Many examples of such cross-linkers are commercially available as will be appreciated by those skilled in the coatings art. Various isocyanates employed as cross-linking agents are described in U.S. Pat. No. 4,322,508. However, the biuret or cyclotrimer of hexamethylene diisocyanate or isophorone diisocyanate are preferred.

Trifunctional isocyanates may be used, for example, triphenylmethane triisocyanate, 1,3,5-benzene triisocyanate, 2,4,6-toluene triisocyanate, an adduct of trimethylol and tetramethyl xylene diisocyanate sold under the trade name "Cythane 3160," "DESMODUR" N 3390 which is the timer of hexamethylene diissocyanate, and the like (DESMODUR is a trademark). Optionally, one can use a polyisocyanate acrylic copolymer derived from isocyanatoethyl methacrylate (commercially available as TMI) and the like, as, for example, disclosed in U.S. Pat. No. 4,965,317 (col. 5).

As most preferred polyisocyanate cross-linker is used the cyclotrimer of hexamethylene diisocyanate.

Other film forming polymers, preferably in an amount of from 0 to 10 wt %, relative to the weight of the binder, may also be used in conjuction with the above-mentioned components. Other film-forming polymers may be linear or branched and may include acrylics, acrylourethanes, polyesters, polyester urethane, polyethers, and polyether urethanes that are compatible with the other components of the binder.

In addition, a coating composition according to the present invention may contain a variety of other optional ingredients, including pigments, pearlescent flakes, fillers, plasticizers, antioxidants, surfactants and flow control agents.

To improve weatherability of a finish produced by the present coating composition, an ultraviolet light stabilizer or a combination of ultraviolet light stabilizers can be added in the amount of about 0.1–3% by weight, based on the weight of the binder. Such stabilizers include ultraviolet light absorbers, screeners, quenchers, and specific hindered amine light stabilizers. Also, an antioxidant can be added, in the about 0.1–3% by weight, based on the weight of the binder.

Typical ultraviolet light stabilizers that are useful incude benzophenones, triazoles, triazines, benzoates, hindered amines and mixtures thereof. Specific examples of ultraviolet stabilizers are disclosed in U.S. Pat. No. 4,591,533.

The composition may also include conventional formulation additives such as flow control agents, for example, RESIFLOW S (polybutylacrylate) (RESIFLOW is a trademark), BYK 320 and 325 (high molecular weight polyacrylates) (BYK is a trademark); rheology control agents, such as fumed silica, microgels, and non-aqueous dispersion polymers; water scavengers such as tetrasilicate, trimethyl orthoformate, triethyl orthoformate, and the like.

When the present composition is used as a clearcoat (topcoat) over a pigmented colourcoat (basecoat) to provide a colourcoat/clearcoat finish, small amounts of pigment can be added to the clear coat to provide special colour or aesthetic effects such as tinting.

The present composition can be pigmented and used as the colourcoat, monocoat, primer, or primer surfacer. The composition has excellent adhesion to a variety of metallic or non-metallic substrates, such as previously painted substrates, cold rolled steel, phosphatized steel, and steel coated with conventional primers by electrodeposition. The present composition can also be used to coat plastic substrates such as polyester reinforced fiberglass, reaction injection-moulded urethanes and partially crystalline polyamides.

When the present coating composition is used as a basecoat, typical pigments that can be added to the composition include the flowing: metallic oxides such as titanium dioxide, zinc oxide, iron oxides of various colours, carbon black, filler pigments such as talc, china clay, barythes, carbonates, silicates and a wide variety of organic coloured pigments such as quinacridones, copper phthalocyanines, perylenes, azo pigments, indanthrone blues, carbazoles such as carbazole viote, isoindolinones, isoindolones, thioindioge reds, benzimidazolinones, metallic flake pigments such as aluminum flake and the like.

The pigments can be introduced into the coating composition by first forming a mill base or pigment dispersion with any of the afore-mentioned polymers used in the coating composition or with another compatible polymer or dispersant by conventional techniques, such as high speed mixing, sand grinding, ball milling, attritor grinding or two roll milling. The mill base is then blended with other constituents used in the coating composition to obtain the present coating compositions.

The coating composition can be applied by conventional techniques such as spraying, electrostatic spraying, dipping, brushing, flowcoating and the like. The preferred technique is spraying.

It will be appreciated that another aspect of the present invention is formed by cured coating composition layers on a carrier or support.

ILLUSTRATIVE EXAMPLES

The present invention is illustrated by the following illustrative examples, however, without restricting its scope to these embodiments.

Example 1

A 21-reactor equipped with thermocouple, reflux condenser, anchor stirrer and nitrogen purge was flushed with nitrogen. Then 250 g of Cardura E10 and 27.7 g xylene were poured into the reactor. This initial reactor charge was heated to 165° C. Then, over a period of 6 hours, the monomer feed was added gradually at a constant temperature of 165° C., under constant stirring and under a light nitrogen flow.
Monomer feed:
72.0 g acrylic acid
180 g hydroxyethylmethacrylate
300.0 g styrene
198.0 g methylmethacrylate
40 g di-tert.-butylperoxide
83.3 g xylene When the feed was completed, additionally 10 g di-tert.-butylperoxide were added in small portions, and the reaction was continued for 1 hour under the conditions named above. After the postreaction was finished, the reactor charge was allowed to cool down to 100 ° C., then butylacetate was added to a solids content (measuring according to ASTM D2369) of 50.0% w/w.

The molecular weight (Mw) was determined by gel permeation chromatography, using polystyrene standards. The molecular weight (Mw) was found to be 3800 g/mol, with a molecular weight distribution (Mw/Mn) of 2.41.

The acid value of the acrylic resin was determined using ISO 3682, it was found to be 5.78 mg KOH/g Resin.

Example 2

A 21-reactor equipped with thermocouple, reflux condenser, anchor stirrer and nitrogen purge was flushed with Nitrogen. Then 150 g of Cardura E10 and 16.6 g xylene were poured into the reactor. This initial reactor charge was heated to 165° C. Then, over a period of 6 hours, the monomer feed was added gradually at a constant temperature of 165° C., under constant stirring and under a light nitrogen flow.
Monomer feed:
43.2 g acrylic acid
180 g hydroxyethylmethacrylate
300 g styrene
326.8 g methylmethacrylate
40 g di-tert.-butylperoxide
94.4 g xylene When the feed was completed, additionally 10 g di-tert.-butylperoxide were added in small portions, and the reaction was continued for 1 hour under the conditions named above. After the postreaction was finished, the reactor charge was allowed to cool down to 100° C., then 668 g of butylacetate were added.

The solids content was measured according to ISO method 3251, giving a value of 56.3% w/w of solid matter.

The molecular weight (Mw) was determined by gel permeation chromatography, using polystyrene standards. The molecular weight (Mw) was found to be 3450 g/mol, with a molecular weight distribution (Mw/Mn) of 2.19.

The acid value of the acrylic resin was determined using ASTM method 2849, it was found to be 6.64 mg KOH/g resin.

Example 3

A 21-reactor equipped with thermocouple, reflux condenser, anchor stirrer and nitrogen purge was flushed with nitrogen. Then 250 g of Cardura E10 and 27.7 g xylene were poured into the reactor. This initial reactor charge was heated to 165° C. Then, over a period of 6 hours, the monomer feed was added gradually at a constant temperature of 165° C., under constant stirring and under a light nitrogen flow.
Monomer feed:
72.0 g acrylic acid
180.0 g hydroxyethylmethacrylate
300.0 g styrene
198.0 g isobornyl methacrylate
40 g di-tert.-butylperoxide
83.3 g xylene When the feed was completed, additionally 10 g di-tert.-butylperoxide were added in small portions, and the reaction was continued for 1 hour under the conditions named above. After the postreaction was finished, the reactor charge was allowed to cool down to 100 C., then butylacetate was added to a solids content (measuring according to ASTM D2369) of 54.4% w/w.

The molecular weight (Mw) was determined by gel permeation chromatography, using polystyrene standards. The molecular weight (Mw) was found to be 3950 g/mol, with a molecular weight distribution (Mw/Mn) of 1.8.

The acid value of the acrylic resin was determined using ISO 3682, it was found to be 5.47 mg KOH/g resin.

Example 4

A 2l-reactor equipped with thermocouple, reflux condenser, anchor stirrer and nitrogen purge was flushed with nitrogen. Then 250 g of Cardura E10 and 27.7 g xylene were poured into the reactor. This initial reactor charge was heated to 165° C. Then, over a period of 6 hours, the monomer feed was added gradually at a constant temperature of 165° C., under constant stirring and under a light nitrogen flow.

Monomer feed:
72.0 g acrylic acid
180.0 g hydroxyethylmethacrylate
300.0 g styrene
100.0 g methyl methacrylate
98.0 g isobornyl methacrylate
40 g di-tert.-butylperoxide
83.3 g xylene When the feed was completed, additionally 10 g di-tert.-butylperoxide were added in small portions, and the reaction was continued for 1 hour under the conditions named above. After the postreaction was finished, the reactor charge was allowed to cool down to 100 C., then butylacetate was added to a solids content (measuring according to ASTM D2369) of 53.6% w/w.

The molecular weight (Mw) was determined by gel permeation chromatography, using polystyrene standards. The molecular weight (Mw) was found to be 8458 g/mol, with a molecular weight distribution (Mw/Mn) of 2.6.

The acid value of the acrylic resin was determined using ISO 3682, it was found to be 6.12 mg KOH/g Resin.

Example 5

A 3l-reactor equipped with a heating mantle, thermocouple, reflux condensator, stainless steel stirrer and nitrogen inlet was flushed with nitrogen. 430.0 g TMP and 810.0 g Cardura E10 were charged into the reactor, and homogenised gradually increasing the temperature. When the system was homogenised, normally at about 120 C., 1.24 g DABCO T9 were added. Then, the temperature in the reactor was slowly raised to 175° C. The reaction was followed by withdrawing samples at regular intervals and determining the decreasing epoxy group content (EGC) value. The reaction was stopped at an EGC below 0.04 eq./kg by cooling.

Comparative Example 1 (as described in patent application PCT WO 97 13741, p.38, Examples 38–42)

326.6 g CARDURA E10 (CE10) and 173.4 g para-hydroxy-benzoic acid were charged into a glass reactor of 1 liter equipped with a heating mantle, a stainless steel stirrer, thermocouple, reflux condenser and nitrogen inlet. The mixture was heated to 110° C. At that point, an exothermic reaction took place and the temperature increased to 135° C. The solution was cooled to room temperature, then the material was characterised as follows: The molecular weight (Mw) was determined by gel permeation chromatography, using polystyrene standards. The molecular weight (Mw) was found to be 492 g/mol, with a molecular weight distribution (Mw/Mn) of 1.01. The acid value was determined using ISO 3682, it was found to be 138 mg KOH/g resin, the epoxy group content 9 meq./kg. The solids content was determined to be 98.7% (measuring according to ASTM D2369).

Comparative Example 2 (as described in patent application PCT WO 96/20968. p.15, Example 1)

160.2 g butyl acetate (BuAc), 136 g of monopentaerythritol and 504 g of methyl hexahydrophthalic anhydride were charged into a 1-liter glass reactor equipped with heating mantle, anchor stirrer and nitrogen inlet, and heated to reflux until they were fully dissolved. Then 750 g of CE10 were added, followed by 1.39 g of dibutyltin dilaureate (DBTL) dissolved in 8.61 g of butylacetate. The mixture was further kept at reflux until the acid value (AV) is below 3 mg KOH/g, then additional 177.33 g of Butyl acetate were added. The characteristics of this product were determined as follows:

The molecular weight (Mw) was determined by gel permeation chromatography, using polystyrene standards. The molecular weight (Mw) was found to be 1020 g/mol, with a molecular weight distribution (Mw/Mn) of 1.08. The solids content was determined to be 78.7% (measuring according to ASTM D2369).

Comparative Example 3: (as described in U.S. Pat. No. 4,314,918)

Into a 2 liter glass reactor equipped with heating mantle, anchor stirrer and nitrogen inlet, 900 g of CE10 and 416 g of neopentyl glycol were charged in the reactor. The mixture was heated at 100° C. At that temperature, 1.416 g (0.1%) of DABCO T9 dissolved in 100 g of CE10. The temperature was increased to 160–170° C. and the reaction followed by withdrawing samples at regular intervals and determining the decreasing epoxy group content (EGC) value. The reaction was stopped at an EGC below 0.04 eq/kg by cooling. The viscosity was determined to be 3170 mPa.s, the molecular weight (Mw) was determined by gel permeation chromatography, using polystyrene standards. The molecular weight (Mw) was found to be 509 g/mol, with a molecular weight distribution (Mw/Mn) of 1.02. The epoxy group content was determined as 37 meq./kg. The solids content was determined to be 93.4% (measuring according to ASTM D2369).

Examples for clear coat compositions

|  | Composition A | Composition B | Composition C | Composition D | Composition E | Composition F | Composition G | Composition H | Composition I |
|---|---|---|---|---|---|---|---|---|---|
| Example 1 | 71.5 g | 84.6 g | 79.00 g | — | — | — | 57.03 g | 54.14 g | 56.55 g |
| Example 2 | — | — | — | 78.2 g | — | — | — | — | — |
| Example 3 | — | — | — | — | 52.62 g | — | — | — | — |
| Example 4 | — | — | — | — | — | 52.72 g | — | — | — |
| Example 5 | 18.5 g | 5.4 g | 11.8 g | 11.0 g | 7.37 g | 7.27 g | — | — | — |
| Comparative Example 1 | — | — | — | — | — | — | 7.96 g | — | — |
| Comparative Example 2 | — | — | — | — | — | — | — | 10.85 g | — |
| Comparative Example 3 | — | — | — | — | — | — | — | — | 8.45 g |
| Isocyanate DESMODUR VPLS 2025/1 | 34.45 g | 27.8 g | 17.40 g | 24.00 g | 22.60 g | 22.25 g | 15.10 g | 15.10 g | 15.10 g |
| Butylacetate | 9.5 g | 9.0 g | — | — | — | — | 11.0 g | 10.0 g | 6.5 g |
| DBTL (1% w/w solution in Butylacetate) | 0.120 g | 0.117 g | — | — | 0.778 g | 0.823 g | 0.547 g | 0.547 g | 0.547 g |
| Viscosity [mPa · s] | 123 | 78 | 132 | 136 | 112 | 169 | 141 | 153 | 153 |
| Solids content [%] | 66.0 | 60.0 | 67.2 | 67.7 | 68.0 | 62.9 | 58.9 | 55.7 | 62.8 |
| Potlife [min] | 60 | 90 | >480 | >480 | 90 | 80 | 90 | 90 | 90 |

Film application:

Films were applied to mild steel panels via spraygun. The wet film built-up was achieved applying first a thin layer of paint mist onto the panel, then the full wet film was applied in a single layer.

Q-panels coated with the clear coats from the examples above were left to dry under different conditions:

a) ambient condition: 23° C.
b) 10 minutes at ambient conditions, then force-cure in a ventilated oven at 80° C. for one hour
c) 10 minutes at ambient conditions, than 1 hour at 80° C.

Hardness was measured hourly after the application were possible, subsequently all coating properties were measured after 7 days.

To determine the acid resistance, the panels are put in a ventilated oven at 50° C. Three droplets of 0.6 N $H_2SO_4$ are put onto the panels in intervals of 30 minutes. After 90 minutes, the panels are rinsed with dimineralized water, the damage by the acid is assessed in a scale from 0 (completely damaged) to 10 (no visible attack). The three results for 30, 60 and 90 minutes exposure are added, and listed in the table 2:Table 2: Physical and mechanical properties.

TABLE 2

Physical and mechanical properties

| Ex. | Drying conditions | Dry film thickness [μm] | Koenig Hardness directly after cure [s] | Time to tack-free [min] | Koenig hardness after 7 d [s] | Erichsen slow penetration [mm] | Direct/Reverse Impact [lb.in] | Acid resistance |
|---|---|---|---|---|---|---|---|---|
| A | a | 59 | n.a. | 144 | 183 | >9.0 | 80/80 | 25 |
|   | b | 57 | 5 | n.a. | 182 | >9.0 | 80/80 | 25 |
|   | c | 55 | 119 | n.a. | 190 | >9.0 | 100/100 | 26 |
| B | a | 54 | n.a. | 144 | 176 | >9.0 | 80/80 | 27 |
|   | b | 54 | 7 | n.a. | 182 | >9.0 | 60/80 | 27 |
|   | c | 52 | 141 | n.a. | 194 | >9.0 | 100/100 | 28 |
| C | a | 55 | n.a. | 348 | 150 | >9.0 | 100/100 | 24 |
|   | b | 50 | n.a. | 244 | 168 | >9.0 | 100/100 | 25 |
|   | c | 50 | 91 | n.a. | 169 | >9.0 | 100/100 | 24 |
| D | a | 50 | n.a. | 348 | 145 | >9.0 | 30/30 | 23 |
|   | b | 50 | n.a. | 244 | 169 | >9.0 | 30/30 | 22 |
|   | c | 55 | 84 | n.a. | 179 | >9.0 | 30/30 | 25 |
| E | a | 55 | n.a. | 144 | 179 | >9.0 | 80/80 | 28 |
|   | b | 55 | 11 | n.a. | 183 | >9.0 | 100/100 | 28 |
|   | c | 55 | 141 | n.a. | 194 | >9.0 | 100/100 | 29 |
| F | a | 54 | n.a. | 144 | 182 | >9.0 | 80/80 | 28 |
|   | b | 55 | 7 | n.a. | 192 | >9.0 | 100/100 | 28 |
|   | c | 54 | 139 | n.a. | 196 | >9.0 | 100/100 | 28 |
| G | c | 50 | 25 | n.a. | 134 | >8.0 | 60/50 | 27 |
| H | c | 50 | 62 | n.a. | 132 | >8.0 | >110/50 | 28 |
| I | c | 50 | 18 | n.a. | 120 | >8.0 | >110/50 | 27 |

What is claimed is:

1. A coating composition comprising 60 to 90 percent by weight of binder components and from 40 to 10 percent by weight of an organic liquid carrier, wherein the binder comprises the following separate components:
 (a) 5 to 50 percent by weight, relative to the weight of the binder, of one or more hydroxy-functional oligoether derived from at least one polyol free of carboxyl groups and having three or four hydroxyl groups, and a monoglycidyl ester of a branched carboxylic acid, containing from 5 to 13 carbon atoms, the oligoether having a number average molecular weight (Mn) of from 150 to 1000, a molecular weight distribution (MWD) <1.10 and a hydroxy value of between 180 and 700,
 (b) 40 to 60 percent by weight, relative to the weight the binder, of one or more hydroxy-functional acrylic or methacrylic copolymer with a Mn between 500 and 2500, having a hydroxy-functional comonomer content between 10 and 50 weight percent of the copolymer, derived from the reaction products of mono-glycidyl esters of a branched carboxylic acid containing from 5 to 13 carbon atoms and acrylic acid or methacrylic acid, and combinations thereof, and optionally mixed with an amount of at most 10 wt % of comonomers, which have been selected from the group consisting of cycloaliphatic (meth)acrylic comonomers and/or alkyl substituted aromatic vinyl comonomers,
 (c) 5 to 40 percent, relative to the weight of the binder, of polyisocyanate cross-linkers, and
 (d) an effective amount of curing catalyst.

2. The coating composition according to claim 1, characterized in that the binder comprises from 10 to 40 percent by weight of a hydroxy-functional oligoether (a).

3. The coating composition according to claim 1, wherein the hydroxy-functional oligoether has a hydroxy value of from 180 to 700 and number average molecular weight of from 250 to 850 g/mol, and a molecular weight distribution MWD <1.10.

4. The coating composition according to the claim 1, characterized in that the oligoether has been derived from a mono-glycidylester of branched carboxylic acid, having 10 carbon atoms.

5. The coating composition according to claim 1, characterized in that the oligoether has been derived from glycerine, trimethylol propane, or pentaerythritol.

6. The coating composition according to claim 1, characterized in that the hydroxy functional monomer (a) partially or totally consists of a reaction product of a monoglycidyl ester of a branched $C_5$–$C_{13}$ carboxylic acid and acrylic acid or methacrylic acid.

7. The coating composition according to claim 1, characterized in that the (meth)acrylate copolymer has an OH value of from 60 to 180, a calculated Tg of at least 40° C., and a number average molecular weight Mn of between 500 and 2500.

8. The coating composition according to claim 1, characterized in that as polyisocyanate cross-linker the cyclotrimer of hexamethylene diisocyanate is used.

9. A cured coating composition, applied on a carrier or support, wherein said cured composition is made by curing a composition comprising 60 to 90 percent by weight of binder components and from 40 to 10 percent by weight of an organic liquid carrier, wherein the binder comprises the following separate components:
 (a) 5 to 50 percent by weight, relative to the weight of the binder, of one or more hydroxy-functional oligoether derived from at least one polyol free of carboxyl groups and having three or four hydroxyl groups, and a monoglycidyl ester of a branched carboxylic acid, containing from 5 to 13 carbon atoms, the oligoether having a number average molecular weight (Mn) of from 150 to 1000, a molecular weight distribution (MWD) <1.10 and a hydroxy value of between 180 and 700,
 (b) 40 to 60 percent by weight, relative to the weight the binder, of one or more hydroxy-functional acrylic or methacrylic copolymer with a Mn between 500 and 2500, having a hydroxy-functional comonomer content between 10 and 50 weight percent of the copolymer, derived from the reaction products of mono-glycidyl esters of a branched carboxylic acid containing from 5 to 13 carbon atoms and acrylic acid or methacrylic acid, and combinations thereof, and optionally mixed with an amount of at most 10 wt % of comonomers, which have been selected from the group consisting of cycloaliphatic (meth)acrylic comonomers and/or alkyl substituted aromatic vinyl comonomers,
 (c) 5 to 40 percent, relative to the weight of the binder, of polyisocyanate cross-linkers, and
 (d) an effective amount of curing catalyst.

* * * * *